(No Model.)
W. N. CUTHBERT.
BLACKBOARD, &c.
No. 454,597.  Patented June 23, 1891.
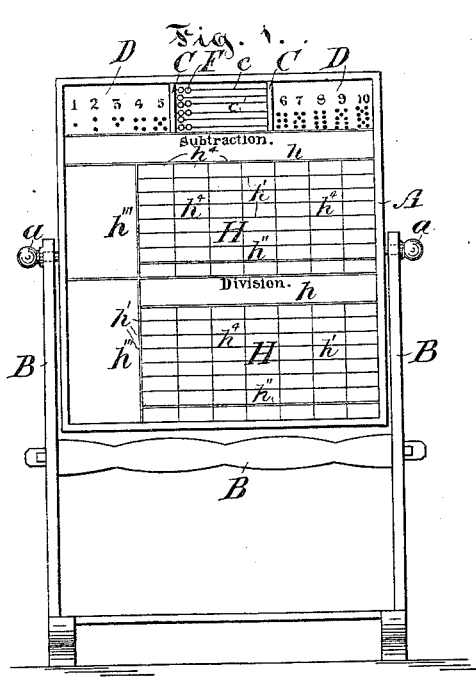
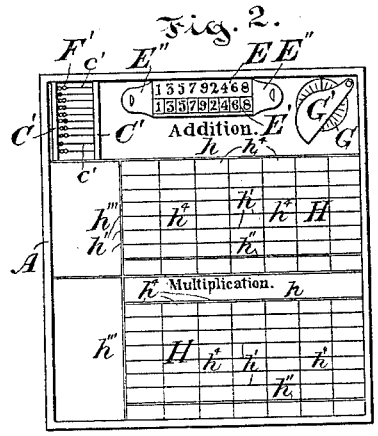
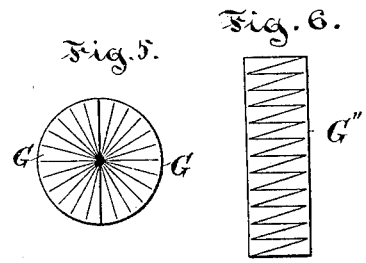
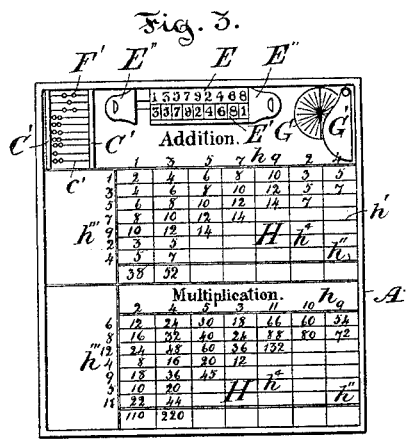
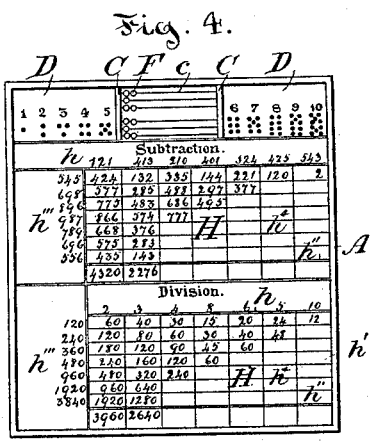
Witnesses:
Chas. Raley.
Arthur Cantin
William N. Cuthbert.
Inventor
A. Harvey
Attorney.

UNITED STATES PATENT OFFICE.

WILLIAM N. CUTHBERT, OF BRIGHT, CANADA.

BLACKBOARD, &c.

SPECIFICATION forming part of Letters Patent No. 454,597, dated June 23, 1891.

Application filed August 13, 1890. Serial No. 361,944. (No model.)

*To all whom it may concern:*

Be it known that I, WILLIAM N. CUTHBERT, of Bright, in the county of Oxford, in the Province of Ontario, in the Dominion of Canada, have invented certain new and useful Improvements in Blackboards and Appliances for Aiding Arithmetical Teaching; and I do hereby declare that the following is a full, clear, and exact description of the same, reference being had to the accompanying drawings, forming a part hereof.

My invention, which will be hereinafter fully set forth and claimed, relates to the construction and arrangement of a blackboard having appliances and columns for aiding the teaching of arithmetic in schools.

The object of the invention is to supply a number of classes up to four with work in the four simple rules of arithmetic in a concise and convenient manner and with the least expenditure of time to the teacher and with easy means of demonstration to the pupils.

Figure 1 is an elevation of my improved blackboard mounted in the stand and showing one face thereof. Fig. 2 shows the reverse side of the same. Fig. 3 shows an example of how the addition and multiplication columns may be used, also how ocular demonstrations may be made. Fig. 4 shows an example of how the subtraction and division columns may be used, and Figs. 5 and 6 show the manner of obtaining the area of the circle by ocular demonstration.

A is a blackboard, having the pivots $a$, and B is a stand upon which said board is reversibly mounted by said pivots, a slot being provided at the top of the uprights of the frame for the reception of the pivots. One side of the board has in the center of the upper margin a rack consisting of a number of rods $c$, held at each end in the slats C, said rods being each provided with beads, balls, or objects F sliding thereon, each rod, except the second from the top and bottom, which have each one, having two beads or balls. On each side of said rack are painted the figures 1 to 10, one-half on one side and one on the other, each figure having its value represented by dots under it. Said figures and dots are comprised in the drawings in the letter D. The reverse side of the board is provided in the center of the upper margin with a row of painted digits E—viz., 1 3 5 7 9 2 4 6 8. Below this line is a row of the same digits, each contained on a separate block E', adapted to slide in a dovetailed groove, so that each may be slid out at the end of the row and be given a different position relative of the line E, so as to admit of the formation of all the possible combinations with any two digits. Stop-slides E'' are placed at each end, which may be slid out of the way, as in Fig. 3, when desiring to move the line E'. On one side of said slides is a rack consisting of the slats C' and 10, rods $c'$, each of which, except the second from the top and bottom, carrying two beads, balls, or objects F', one only being contained on the two referred to. On the other side of the slides E'' is a circular recess containing a removable circular disk G, of leather or similar material and held therein by a turn-button G'. Said disk is cut into two half-circles, and each is divided into a large number of small sectors by radial cuts severing the material to within a narrow margin near the circumference. When taken from their recess, each half-circle may be straightened out, so that the circumference assumes a practically straight line measuring half the circumference in length and equal to the radius in width. The two halves thus straightened out may be brought into close contact and interlocked to form a rectangle G'', as in Fig. 6, the area of which is equal to the area of the circle. The main portion of the board-space below the upper margin on each side is ruled with horizontal and vertical lines to form blank tables H for addition and multiplication and subtraction and division, respectively, said headings being painted at the top of the respective blank tables. Each table consists of the marginal space $h$ at the top and eight horizontal lines $h'$, the bottom line $h''$ being double ruled for adding up results; also, of a large marginal vertical space $h'''$ on the left and seven columns $h^4$.

The figures D exhibit to the pupils their shape and the dots below them their value.

The value of any figure may be further demonstrated by the beads or balls F or F' in the racks C or C' by sliding out from the side of the racks to the center the required number for the figure which it is desired to demonstrate—as, for instance, the value of 5 illustrated in Fig. 3. Addition and the other simple rules of arithmetic can be similarly demonstrated by means of the balls in the racks in a manner that will readily suggest itself to the trained teacher. For this purpose the slide-blocks E' may also be used by changing their position in relation to the upper line and the values demonstrated by means of the balls F' in the rack C'.

Exercises are set to the pupils by writing the figures near each column $h^4$ in the margin $h$ and opposite each line in the marginal column $h'''$, except opposite the last line, which is reserved for adding up the results, the answers being written in the corresponding spaces in the blank-table. Thus, for example, as shown in the addition-table in Fig. 3, 1 at the top and 1 opposite the first line is 2, which is written in the first space; 3 and 1 are 4, written in the second space, &c. Then 1 at the top and 3 opposite the second line is 4, which is written in the first space of the second line; 3 and 3 are 6, written in the second space, &c. The correctness of the answers may then be checked by adding up the answers in each column and writing them in the bottom line, and these may be compared with a written or printed table for convenience. The other rules of arithmetic may be similarly treated, as shown in the three remaining illustrations in Figs. 3 and 4.

I claim as my invention—

As an article of manufacture, the reversible blackboard consisting of the board A, having thereon a rack composed of six rods $c$, held in two groups of three each in slats C and holding alternately two and one movable beads, balls, or objects F, the figures D, counting from 1 to 10, inclusive, each having its value represented by dots grouped in twos and ones under each, a rack composed of ten rods $c'$, held in slats C', said rods holding alternately two and one movable beads, balls, or objects F', a line of painted digits E, with a line of movable and interchangeable blocks E' placed immediately below said line of digits and each having a similar digit painted upon it, a stop-slide E'' placed at each end of the line of said slide-blocks E', a recess with turn-button G', the removable circular disk G, of flexible material, held in the recess by said button G' and divided in two halves and having incisions forming a large number of small sectors, and the four blank tables H, composed of the upper margins $h$, lines $h'$ and $h''$, wide column $h'''$, and columns $h^4$, formed on the lower slatted surface of each side of the board A.

In testimony whereof I have signed in the presence of the undersigned witnesses.

WILLIAM N. CUTHBERT.

Witnesses:
B. HARVEY,
G. ALLEN.